US007142849B2

(12) United States Patent
Neuman

(10) Patent No.: US 7,142,849 B2
(45) Date of Patent: Nov. 28, 2006

(54) PROCESS FOR REMOTE COMMUNICATION BETWEEN A COMMAND TRANSMITTER AND A COMMAND RECEIVER

(75) Inventor: Serge Neuman, Seynod (FR)

(73) Assignee: Somfy SAS, Cluses (FR)

( * ) Notice: Subject to any disclaimer, the term of this patent is extended or adjusted under 35 U.S.C. 154(b) by 238 days.

(21) Appl. No.: 10/803,725

(22) Filed: Mar. 18, 2004

(65) Prior Publication Data

US 2004/0185844 A1 Sep. 23, 2004

(30) Foreign Application Priority Data

Mar. 18, 2003 (FR) .................................. 03 03307

(51) Int. Cl.
*H04Q 7/20* (2006.01)

(52) U.S. Cl. ...................... 455/420; 455/418; 455/419; 455/11.1; 455/422.1; 455/352; 340/5.1; 340/5.7; 340/5.64; 340/5.65; 340/5.71; 340/5.72

(58) Field of Classification Search ................ 455/418, 455/419, 420, 403, 422.1, 409, 410, 411, 455/412.1, 412.2, 550.1, 500, 517, 557, 575.1, 455/3.03, 3.06, 445, 414.1, 414.4, 466, 423, 455/424, 425, 426.1, 426.2, 9, 11.1, 66.1, 455/344, 348, 346, 347, 352, 353; 340/5.1, 340/5.7, 5.64, 5.65, 5.71, 5.72, 5.77
See application file for complete search history.

(56) References Cited

U.S. PATENT DOCUMENTS

| | | | | |
|---|---|---|---|---|
| 6,333,698 | B1 * | 12/2001 | Roddy ................... | 340/825.72 |
| 2001/0011941 | A1 | 8/2001 | King et al. ................ | 340/5.64 |

FOREIGN PATENT DOCUMENTS

| | | | |
|---|---|---|---|
| DE | 2 354 621 | A | 3/2000 |
| EP | WO 92/01979 | * | 2/1992 |
| EP | 1 052 608 | A1 | 11/2000 |
| FR | 2 813 978 | A | 3/2000 |

* cited by examiner

*Primary Examiner*—Keith Ferguson
(74) *Attorney, Agent, or Firm*—Frommer Lawrence & Haug, LLP; Ronald R. Santucci

(57) ABSTRACT

A system for activating an object actuating system coupled to a movable object such as a gate or garage door includes a user command transmitter that is manipulable by a person to generate a signal representing an identification and a command. A repeater receives the signals from the command transmitter and in turn, in the presence of a valid ID, sends a command signal to the object actuating system, which in turn moves the object only if the ID from the repeater (which can be different from the ID from the command transmitter) is valid.

10 Claims, 3 Drawing Sheets

PROCESS FOR REMOTE COMMUNICATION BETWEEN A COMMAND TRANSMITTER AND A COMMAND RECEIVER

BACKGROUND OF THE INVENTION

The invention relates to a process for remote communication between a command transmitter and a command receiver operating a garage door or gate actuator, via a command repeater furnished with means for receiving signals, with means for sending signals, with a processing unit and with a memory comprising an identifier of the command repeater. It also relates to a process for configuring a control device comprising a command transmitter furnished with means for sending signals, a command repeater furnished with means for receiving signals, with means for sending signals, with a processing unit and with a memory and a command receiver operating a garage door or gate actuator, allowing remote communication between the command transmitter and the command receiver via the command repeater. The invention also relates to a command repeater and a control device comprising a command repeater.

DESCRIPTION OF THE PRIOR ART

In most cases, users of motorized garage doors possess a remote control making it possible to control opening and closing thereof. Most of the time, the remote controls are actuated from inside a vehicle to control these doors or gates. Thus, for reasons of simplicity, the remote controls are often left in the vehicle.

To avoid the problems of loss of remote control, recourse may be had to remote control devices integrated into the vehicle, such as that described, for example, in patent application EP 0 689 964, the content of which is incorporated by reference. This document discloses a transmitter of control commands that is integrated into the vehicle, in the sun visor.

There is a problem with this type of device. Specifically, if a vehicle equipped with this garage opening device is parked outside the garage, it suffices to break into the vehicle in order to open the garage and allow entry thereto. A similar problem arises when the vehicle is stolen. These situations are particularly awkward when the garage serves as access to the residence.

Patent applications DE 43 28 392, the content of which is incorporated by reference, and DE 196 52 292, the content of which is incorporated by reference, disclose devices for controlling the opening of garage doors. These devices comprise a mobile command transmitter making it possible to control a garage door. In the case where the power of the mobile command transmitter is not sufficient to operate the door, the control command sent by the latter is relayed by a command repeater situated in the vehicle. This device makes it possible to control a motorized access with the mobile command transmitter and/or with the command repeater. The security problems cited above may arise if the vehicle or the command transmitter is stolen.

Additionally, patent application EP 1 052 608, the content of which is incorporated by reference, discloses a remote communication system comprising a remote control and a garage door actuator. The remote control is situated in a vehicle and sends commands in the form of radio signals having a first carrier frequency fa. The actuator comprises a command receiver that is able to receive commands in the form of radio signals having a second carrier frequency fb. To ensure compatibility between the remote control and the actuator, a repeater capable of receiving commands in the form of radio signals of carrier frequency fa and of converting them and transmitting them in the form of radio signals of carrier frequency fb, is installed in the building equipped with the garage door actuator. This system affords no solution to the security problems alluded to above.

SUMMARY OF THE INVENTION

The aim of the invention is to propose a process and a device improving the known processes and devices of the prior art and alleviating the drawbacks cited. In particular, the invention sets out to achieve a process for controlling the opening of an access to a building which is safe, in so far as simply breaking into the vehicle which contains the control device or stealing a mobile command transmitter associated with the device is not sufficient to open the access.

The communication process according to the invention is one which comprises the following steps:

- generation and transmission of a signal comprising an identifier of the transmitter and a control command, from the transmitter to the command repeater,
- reception of this signal by the command repeater,
- recognition of the identifier contained in the signal,
- modification of the identifier by the command repeater,
- transmission of a modified signal comprising a modified identifier and the command, from the command repeater to the command receiver,
- reception of the modified signal by the command receiver,
- recognition of the modified identifier contained in this signal.

Various modes of execution of the process are defined by dependent claims 2 and 3.

The configuration process according to the invention is one wherein the learning of identification codes comprises a communication between the command transmitter and the command repeater, on the one hand, and a communication between the command repeater and the command receiver, on the other hand, the identification codes of the command transmitter and of the command repeater being different.

The command repeater according to the invention comprises means for receiving signals, means for sending signals, a processing unit and a memory furnished with an algorithm allowing the implementation of the above processes.

The command repeater may be devoid of any user interface.

The command repeater may be placed in a vehicle and powered by the battery via the ignition switch of the vehicle.

The control device according to the invention comprises a command repeater defined above, a command transmitter and a command receiver operating a garage door or gate actuator.

The command repeater is intended to receive a command signal consisting at least of an identification code and of a control command. This signal acts as a code for unlocking the command repeater. On receipt of this command signal, the command repeater relays the control command to the command receiver with an identification code. This identification code is a code for pairing between the command repeater and the command receiver. It differs from the identification code used for communication between the command transmitter and the command repeater. It may also be a combination of the identification code of the command repeater and of the identification code of the command transmitter. The identification code of the command transmitter alone is not recognized by the command receiver.

Thus, the command transmitter may not communicate directly with the command receiver. Likewise, the command repeater cannot generate control commands for the command receiver, it can only transfer the commands received from the command transmitter.

The elements of the device, taken separately, therefore offer enhanced security against theft.

To further secure the device, the command repeater can be connected to an electrical energy source activated only in the presence of the ignition key of the vehicle and, consequently, react to the command signal only when the ignition key is in the vehicle's ignition starter switch.

These various configurations offer several advantages:

the system is secure should the vehicle be stolen or broken into.

The command transmitter can be miniaturized. Specifically, the range requirement up to the command repeater is small, hence only a small transmit power is necessary. The saving in size therefore stems from the saving in the batteries. A very small transmitter of remote commands can easily be carried like a key ring with the keys of the vehicle for example.

The command repeater has no dimensional and power supply constraints, it may be placed outside the cabin and powered directly by virtue of the battery. Thus, it is also possible to eliminate problems linked with the equipotential exhibited by the vehicle.

The two aspects of the invention could be used in combination.

The solution proposed by the invention, in particular in the variant linking the command repeater to the ignition switch of the vehicle, necessitates the presence of the user in the vehicle or close to the command repeater at the moment of command. This poses no particular problem in respect of the opening or closing of a gate. In respect of the control of motorized garage doors, this secure solution is suitable for garages exhibiting an access other than the controlled motorized access. In other cases, it is possible to use a conventional remote control which communicates directly with the command receiver operating the garage door actuator. It is also possible to use a command repeater placed near the garage door or in some other appropriate location of the building. To ensure double security, it is conceivable to use a repeater housing furnished with means for making secure, for example of the digicode, key type etc.

Thus, a command transmitter that does not by itself make it possible to actuate the garage door can be used, in combination with a secure repeater. The command sent by the command transmitter can be placed in memory in the repeater for a given time and transmitted only, including the transformation of the identifier, for example when the appropriate code has been input in the repeater with the aid of the digicode.

Such a repeater could be used in an installation jointly with a repeater installed in a vehicle.

The device is secure, also in respect of programming (or pairing), against any attempted fraud.

For pairing, immediately after having received a programming frame sent by the command transmitter, the command repeater according to the invention learns the identifier of the command transmitter and in its turn sends, intended for the command receiver, a programming frame comprising its own identifier or a combination of its own identifier and of the identifier of the command transmitter.

The identifier of the command repeater can be created during the programming phase and be a function of or dependent on the identification code of the command transmitter.

Alternatively, the command repeater learns the identifier of the command transmitter and an identifier of the command receiver during a send by the command receiver when the latter is placed in programming mode. The two identifiers may then be linked.

Alternatively, the command repeater learns (selects) its own identifier during a send by the command receiver in programming mode. In all cases, the identification codes of the transmitter and of the command repeater are different.

BRIEF DESCRIPTION OF THE DRAWINGS

The appended drawing represents, by way of examples, an embodiment of the device according to the invention.

DESCRIPTION OF THE PREFERRED EMBODIMENTS

Figure 1:
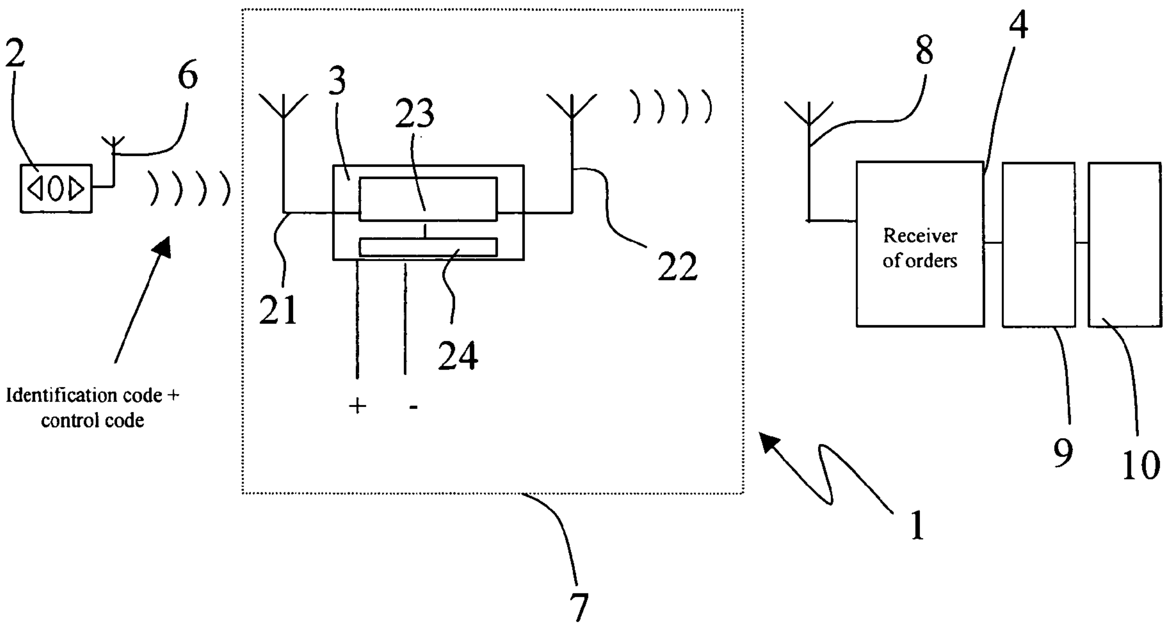
FIG. 1 is a diagram of an embodiment of the control device according to the invention.

The control device 1 represented in FIG. 1 comprises a command transmitter 2 of mobile type, a command repeater 3 situated in a vehicle 7 and a command receiver 4 operating a garage door 10 or gate actuator 9.

The command transmitter 2 comprises a keypad having keys with which are associated means for generating control commands and means 6 for sending these commands, for example, by the intermediary of radio waves or of infrared beams.

The command repeater 3 consisting of an electronic housing is situated in the vehicle 7. It comprises means 21 for receiving control commands despatched by the command transmitter 2, means 22 for sending control commands bound for the command receiver 4, a processing unit 23 and a memory 24. These commands are, preferably, sent in the form of radio waves. The command repeater 3 is powered preferably by the battery of the vehicle. Its function is to relay the commands sent by the transmitter 2 to the actuator 4. It has no user interface making it possible to control the operating of the door. It can, consequently, be sited at any location in the vehicle.

The command receiver 4 is situated in the garage in proximity to the door or in proximity to a gate post. It is powered from the mains and connected to an actuator 9. This actuator 9 comprises a motor which provides the mechanical energy necessary for operating the door or the gate.

The nature or the frame of the control commands sent by the command transmitter 2 is different from that of the control commands sent by the command repeater 3. Thus, the command receiver 4 cannot receive and/or interpret directly the commands emanating from the command transmitter 2.

When the user presses one of the keys of the command transmitter 2, the latter sends a command signal comprising its own identification code and a control code associated with the key to the command repeater 3. The latter recognizes the identification code of the transmitter 2 and then in its turn sends a command signal comprising its own identification code or a combination of its code and of that of the command transmitter and the control code. The command receiver 4 recognizes the identification code sent by the command repeater and makes the actuator 9 execute the command desired by the user.

The command transmitter 2 whose signals are always relayed by the command repeater can be miniaturized. Specifically, the range of the signal that it sends may be very small. It consequently consumes little energy and the cell powering it can have reduced dimensions.

Figure 2:
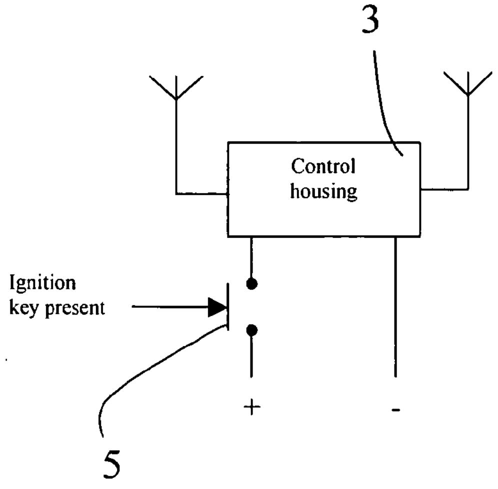
FIG. 2 is a diagram of a variant of this embodiment.

In a variant embodiment, represented in FIG. 2, of the device, the command repeater 3 is powered by the battery of the vehicle via the ignition switch 5 for energizing the electric circuit of the vehicle 7. In this way, the command repeater can despatch control commands only if the ignition key is present in the vehicle's ignition switch.

For security's sake, the housing of the command repeater is not furnished with any button for placing in programming mode. The recording of identification codes thus follows upon a send by the command receiver when the latter is placed in programming mode and/or ought to be carried out in a time slot following the placing of the command receiver in programming mode.

The command repeater being a transmitter/receiver, a distinction is made between the case in which it dispatches one of these identification codes to the command receiver and that in which it receives an identification code provided by the command receiver.

Figure 3:
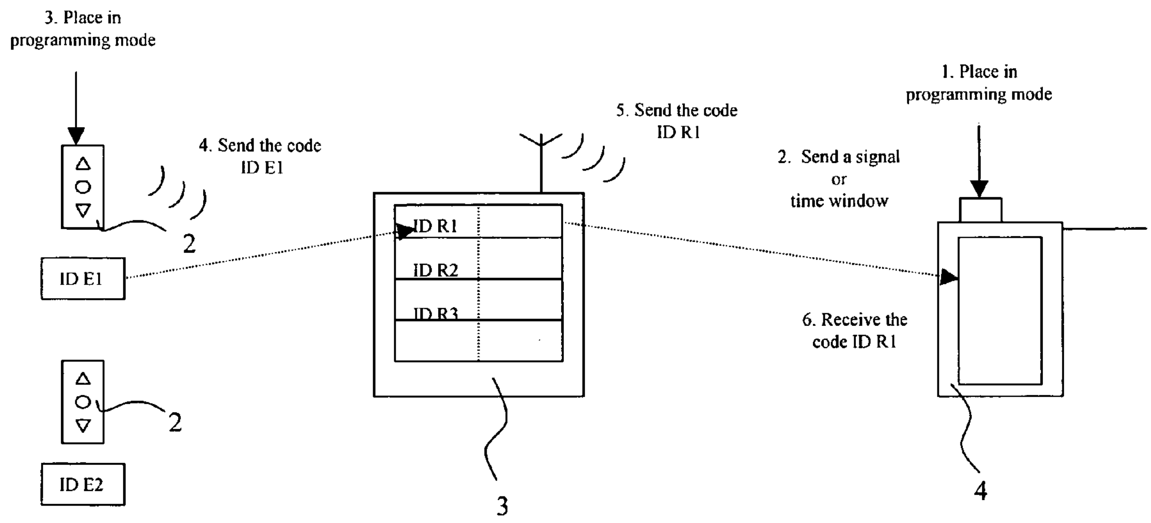
FIG. 3 is a diagram illustrating a first variant of the configuration process for the control device.

As represented in FIG. 3, during placement of the command receiver in programming mode, a signal is sent to the command receiver to make it go to programming mode. The command transmitter must then also be placed in programming mode and it despatches its identification code ID E1 to the command repeater. The latter then despatches an identification code ID R1 associated with the code ID E1 to the command receiver. These operations may take place in a time slot defined from the placing of the command receiver in programming mode. A signal sent by the latter is not necessary.

Upon the sending of a command by the transmitter E1, the command repeater retransmits the control command using the authentication code ID R1 associated with the code ID E1 of the transmitter E1.

Upon the sending of a command by another associated transmitter E2, the command repeater retransmits the command to the same receiver with an identification code ID R2.

Figure 4:
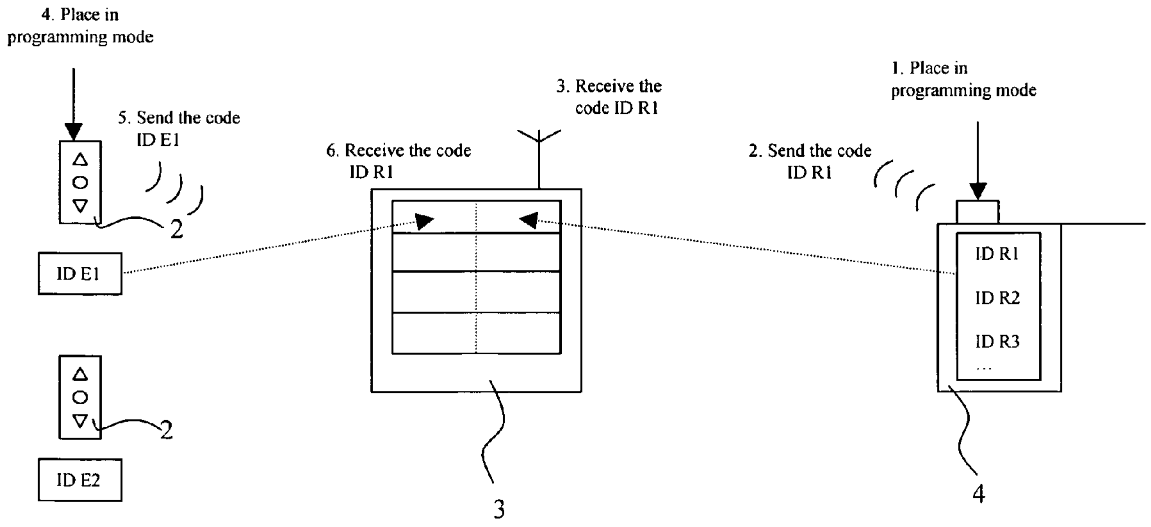
FIG. 4 is a diagram illustrating a second variant of the configuration process for the control device.

In a configuration process variant represented in FIG. 4, the command receiver despatches a code out of a list of codes that it contains in memory. The command repeater associates this code with a code that it has received from the command transmitter.

Figure 5:
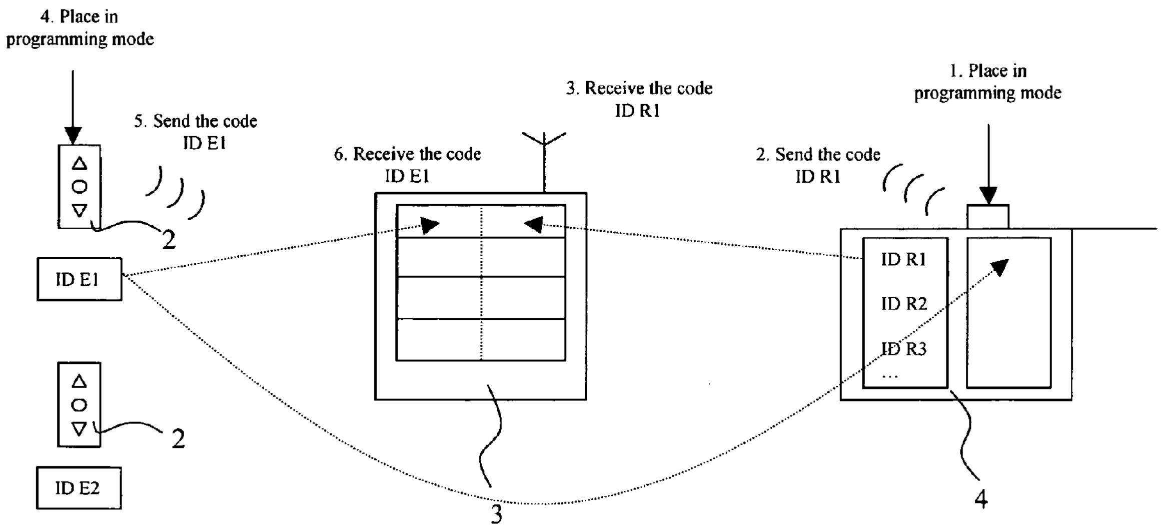
FIG. 5 is a diagram illustrating a third variant of the configuration process for the control device.

In another variant of the configuration process represented in FIG. 5, the command transmitter despatches its identification code both to the repeater and to the command receiver. Alternatively, the code of the command transmitter may possibly be relayed by the command repeater to the command receiver during configuration.

Pairing may be achieved at reduced range, so as to secure the configuration process further.

In certain cases, in particular when the actuator has no means of sending, it is also possible to provide a button for placing in programming mode on the housing of the command repeater. To make access secure, the identification code despatched to the command receiver must then link the identification codes of the command transmitter and of the command repeater.

The expression identification code is understood to mean in particular any elaborate mode of authentication.

The invention claimed is:

1. A process for remote communication between a command transmitter (2) and a command receiver (4) operating a garage door (10) or gate actuator (9), via a command repeater (3) furnished with means for receiving signals (21), with means for sending signals (22), with a processing unit (23) and with a memory (24) comprising an identifier of the command repeater (3), which process comprises the following steps:

- generation and transmission of a signal comprising an identifier of the transmitter (2) and a control command, from the transmitter (2) to the command repeater (3),
- reception of this signal by the command repeater (3),
- recognition of the identifier contained in the signal,
- modification of the identifier by the command repeater (3) to include a code dependent on a repeater identifying code,
- transmission of a modified signal comprising a modified identifier and the command, from the command repeater (3) to the command receiver (4),
- reception of the modified signal by the command receiver (4),
- recognition of the modified identifier contained in this signal.

2. The process as claimed in claim 1, wherein the step of "modification of the identifier by the command repeater" comprises the substitution of the identifier of the transmitter (2) by the identifier of the command repeater (3).

3. The process as claimed in claim 1, wherein the step of "modification of the identifier by the command repeater" comprises the substitution of the identifier of the transmitter (2) by a combination of the identifier of the transmitter (2) and of the identifier of the command repeater (3).

4. A command repeater (3) comprising means for receiving signals (21), means for sending signals (22), a processing unit (23) and a memory (24) furnished with an algorithm embodying the process of claim 1.

5. The command repeater (3) as claimed in claim 4, which repeater is devoid of any user interface.

6. The command repeater (3) as claimed in claim 4, which repeater is placed in a vehicle (7) and powered by the battery via the ignition switch (5) of the vehicle.

7. The command repeater (3) as claimed in claim 4, which repeater is provided with a user interface allowing input of a code.

8. A control device (1) comprising a command repeater (3) as claimed in claim 4, a command transmitter (2) and a command receiver (4) operating a garage door (10) or gate actuator (9).

9. A process for configuring a control device (1) comprising

- a command transmitter (2) furnished with means for sending signals (6),
- a command repeater (3) furnished with means for receiving signals (21), with means for sending signals (22), with a processing unit (23) and with a memory (24) and
- a command receiver operating a garage door (10) or gate actuator (9), allowing remote communication between the command transmitter (2) and the command receiver (4) via the command repeater (2), wherein learning of identification codes comprises a communication between the command transmitter (2) and the command repeater (3), on the one hand, and a communication between the command repeater (3) and the command receiver (4), on the other hand, wherein identification generated by the command transmitter and sent to the repeater is different from identification generated by the repeater and sent to the command receiver, in that the latter includes a code dependent on a repeater identifying code.

10. A system for activating an object actuating system coupled to a movable object, comprising:

at least one user command transmitter manipulable by a person to generate at least one signal representing at least one of: an identification, and a command; and at least one repeater receiving signals from the command transmitter, the repeater sending a command signal to the object actuating system upon receipt of a valid identification from the command transmitter, wherein the object actuating system moves the movable object only if a valid identification is received from the repeater, and wherein the identification generated by the command transmitter and sent to the repeater is different from the identification generated by the repeater and sent to the object actuating system, in that the latter includes a code dependent on a repeater identifying code.

* * * * *